Patented Sept. 14, 1926.

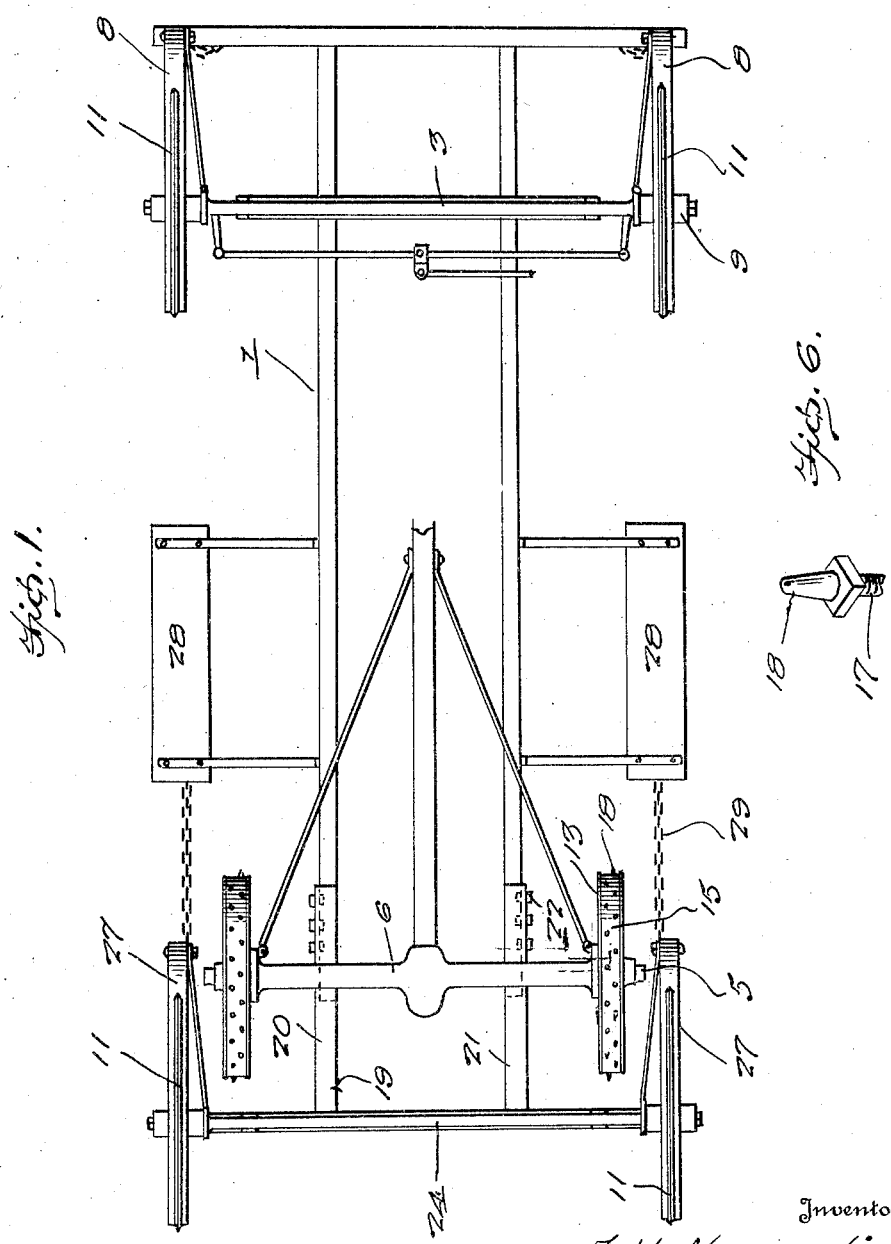

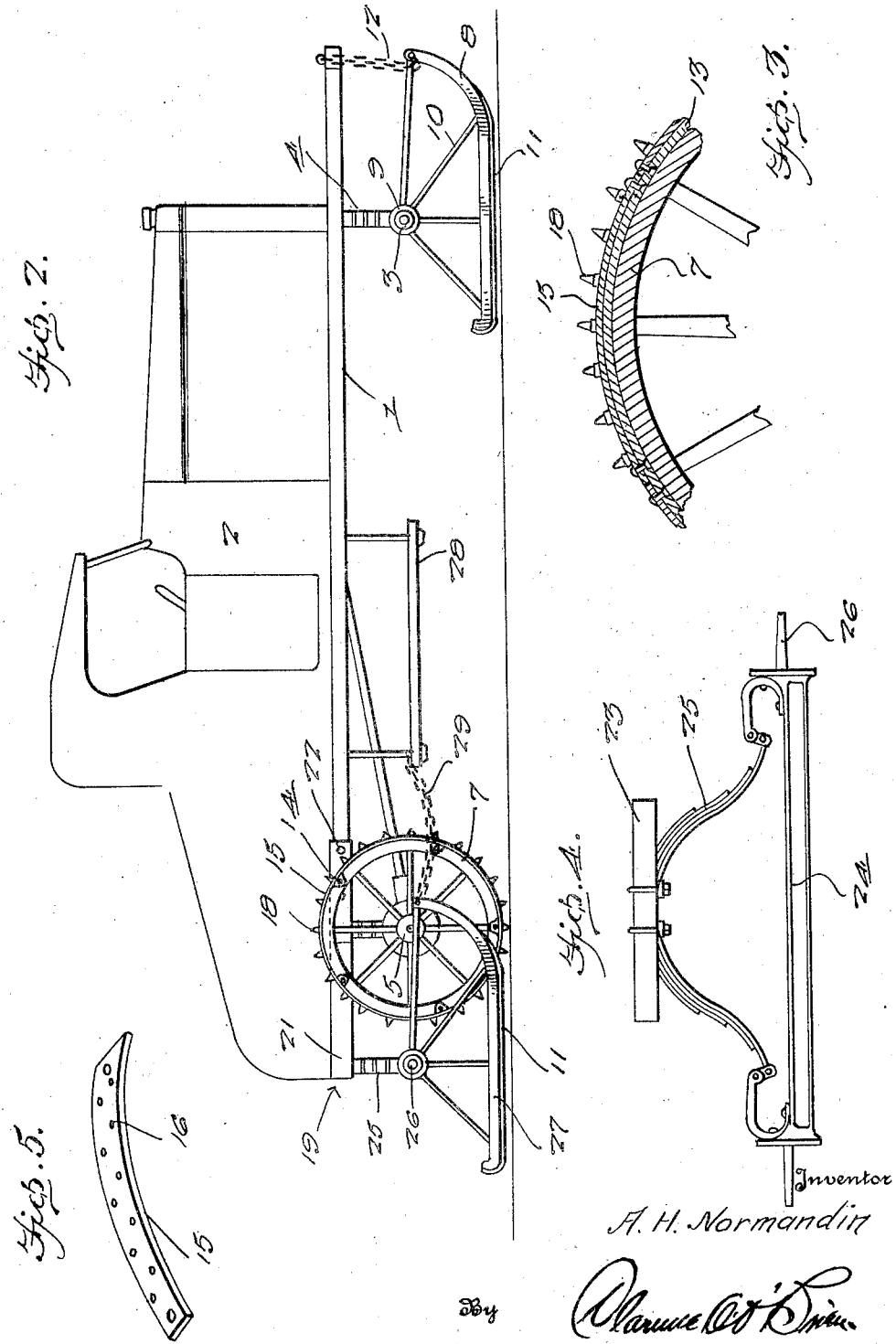

1,599,915

UNITED STATES PATENT OFFICE.

ALFRED H. NORMANDIN, OF BROCKTON, MASSACHUSETTS.

CONVERTIBLE NONSKID AUTO SLEIGH.

Application filed April 17, 1925. Serial No. 23,881.

This invention relates to improvements in motor vehicles and is more particularly adapted to a means whereby a wheeled motor vehicle may be readily and easily converted into a sleigh.

One of the important objects of the present invention is to provide a vehicle of the above mentioned character, which is of such construction as to permit the converting of the automobile into a sleigh for use upon ice or snow without necessitating the material alteration of the automobile.

A further object is to provide a vehicle of the above mentioned character, wherein runners are substituted for the front wheels of the vehicle, the tires on the rear or drive wheels of the vehicle being removed, and rims having ground engaging spurs associated therewith substituted for the tires, an additional pair of runners being arranged adjacent the drive wheels of the vehicle.

A further object is to provide a convertible automobile sleigh which includes an auxiliary frame adjustably supported on the rear of the automobile frame, the rear runners being supported on the axle which is carried by the auxiliary frame, said auxiliary frame further providing a means for supporting the weight of the body of the automobile at the rear thereof.

A still further object is to provide a vehicle of the above mentioned character, which is simple in construction, inexpensive, strong and durable, and further well adapted for the purpose for which it is designated.

Other objects and advantages of this invention will become apparent during the course of the following detailed description.

In the drawing, forming a part of this specification and in which like reference characters indicates corresponding parts throughout the several views:

Figure 1 is a bottom plan view of the automobile sleigh.

Figure 2 is a side elevation.

Figure 3 is a fragmentary sectional view of a portion of one of the drive wheels showing a section of the rims with the ground engaging spurs carried thereby secured on the wheel.

Figure 4 is an end elevation of the auxiliary axle and the supporting frame therefor.

Figure 5 is a detail perspective view of one of the sections of the rim, and

Figure 6 is a detail perspective view of one of the spurs.

In the drawings, wherein for the purpose of illustration is shown the preferred embodiment of my invention, the numeral 1 designates generally the chassis of an automobile, the body supported thereon being indicated at 2 and being of any conventional construction. The front axle of the vehicle is indicated at 3, and the usual spring suspension means thereof is illustrated at 4. The rear axle is shown at 5, the usual housing therefor being shown at 6. The wheels which are mounted on the respective ends of the rear axle 5 are illustrated at 7. It is of course understood that when the vehicle is in ordinary use, as an automobile, the front wheels are supported on the respective ends of the front axle 3 and the vehicle drive wheels 7 are provided with the usual tires.

In order that the automobile may be converted into a motor sleigh, the front wheels of the automobile are removed, and the front runners 8 are substituted therefor. Each of the front runners includes a hub portion 9 which is supported on the end of the front axle or spindle 3, and the supporting and bracing standards 10. The front end of the runner is curved upwardly and for the purpose of preventing the skidding of the runners when the vehicle is travelling over an icy surface, the bottom of each runner is provided with a longitudinally extending rib 11. A chain 12 is secured at one end to the forward end of the chassis 1, and at its opposite end to the upwardly curved forward end of each runner 8, the purpose thereof being hereinafter more fully described.

The usual rubber tires are removed from the rear drive wheels 7 and in their place there is substituted the metallic rims 13, the same being detachably supported on each of the drive wheels by each of the lugs 14. A series of segmental plate sections 15 are secured on the outer periphery of the rim 13, and each of the plate sections is provided with the threaded openings 16 for receiving the threaded shanks 17 of the ground engaging spurs 18. The spurs 18 provide a means for increasing the traction of the vehicle while passing over a snow or ice covered road.

An auxiliary frame designated generally by the numeral 19 is adapted to be detachably associated with the rear end of the chassis 1, when the vehicle is used as a sleigh, and the auxiliary frame includes the channeled members 20 and 21 respectively, the forward ends thereof cooperating with the rear ends of the respective sides of the chassis 1, and being detachably secured thereto, through the medium of the fastening bolts 22, in the manner as more clearly illustrated in Figures 1 and 2 of the drawings. The auxiliary frame furthermore includes the transversely extending member 23, which bridges the rear end of the channel members 20 and 21. An auxiliary axle 24 is associated with the auxiliary frame 19, the same being connected to the transversely extending cross member 23, through the medium of the auxiliary spring 25, as is more clearly illustrated in Figure 4 of the drawings. The auxiliary axle 24 is provided at its respective ends with the spindles 26. The axle 24 is such a length as to have the spindles 26 thereof extending beyond the spindles of the front and rear axles respectively, in the manner as clearly illustrated in Figure 1. The purpose of this construction will be hereinafter more fully described.

Rear runners 27 similar to the front runners 8 are supported on the respective spindles 26 of the auxiliary axle 24, and as the rear runners are of the same construction as the front runners, a further detailed description is not thought necessary. By constructing all of the runners alike, the same may be readily interchanged, whenever it becomes necessary. As is illustrated in Figures 1 and 2 of the drawings, the runners 27 are disposed adjacent the rear drive wheels 7 and the forward ends of the rear runners are connected to the running board 28 by means of the chains 29, the purpose of which will be presently apparent.

The auxiliary frame 19 provides a means for supporting the weight of the rear portion of the body. The chains 29 will prevent any possibility of the rear runners 27 being moved out of place, should the same encounter an obstruction. In a similar manner, the front chains 12 will maintain the front runners 8 in their proper position With the parts arranged as shown in Figures 1 and 2, a vehicle will be propelled along a snow or ice covered surface by its own motor power, in a simple and efficient manner. When it is desired to convert the sleigh into an automobile, the front and rear runners are removed, as well as removing the auxiliary frame 19, from engagement with the rear portion of the chassis 1. The rims 13 are also detached from the rear driving wheels 7 and the usual rubber collars are placed on the rear wheels, it being unnecessary to remove the rear wheels either in using the vehicle as a sleigh or as an automobile. After the front runners have been removed, the usual front wheels with the tires thereon are placed on the spindles of a front axle, and the vehicle is then ready for use in the usual manner.

It will thus be seen from the foregoing description, that a vehicle has been provided which is of such a construction, as to permit the same to be readily and easily converted into a motor sleigh, without materially altering the vehicle. Furthermore, the drive wheels of the vehicle are utilized as traction increasing means when the vehicle is in use as a sleigh.

While I have shown the preferred embodiment of my invention, it is to be understood that various changes in the size, shape and arrangement of parts may be resorted to, without departing from the spirit of the invention or the scope of the appended claims.

What I claim is:

1. In combination with a motor vehicle including the chassis, the front and rear axles thereof, of an auxiliary frame comprising a pair of side members, the forward end thereof being secured to the respective sides of the rear end of the chassis, a cross bar extending transversely across the rear ends of said side members, an auxiliary axle arranged rearwardly of the rear axle, spring suspension means for the auxiliary axle associated with the cross member, runners mounted on the front and auxiliary axles, respectively, ground engaging wheels mounted on the rear axle, and flexible means for securing the forward ends of the runners to the motor vehicle for maintaining the same in a normal position.

2. In combination with a motor vehicle including the chassis, and a front and rear axle thereof; of an auxiliary frame comprising a pair of channeled side members, the forward ends thereof being detachably secured to the respective sides of the rear end of said chassis adjacent the rear axle, a cross bar extending transversely across the rear ends of said channeled side members, an auxiliary axle arranged rearwardly of the rear axle, spring suspension means for the auxiliary axle associated with said cross bar, runners mounted on the front and auxiliary axles respectively, traction increasing wheels mounted on the rear axle, and flexible means for securing the forward ends of the runners to the motor vehicle for maintaining the runners in a normal position.

In testimony whereof I affix my signature.

ALFRED H. NORMANDIN.